G. Wellhouse.
Harvester Rake.

No. 54,235

Patented April 24, 1866

George Wellhouse
By Daniel Breed Atty

G. Breed
A. Boone

UNITED STATES PATENT OFFICE.

GEORGE WELLHOUSE, OF AKRON, OHIO.

IMPROVEMENT IN HARVESTER-RAKES.

Specification forming part of Letters Patent No. 54,235, dated April 24, 1866.

*To all whom it may concern:*

Be it known that I, GEORGE WELLHOUSE, of Akron, in the county of Summit and State of Ohio, have invented a new and useful Improvement in Harvesters; and I do hereby declare that the following is a full and exact description thereof, reference being had to the accompanying drawings, and to the letters of reference marked thereon.

My invention consists in a new combination and arrangement of devices for operating a rake under the platform of a harvester, and in a new mode of discharging the gavel at one side of the grain-platform.

Figure 1:
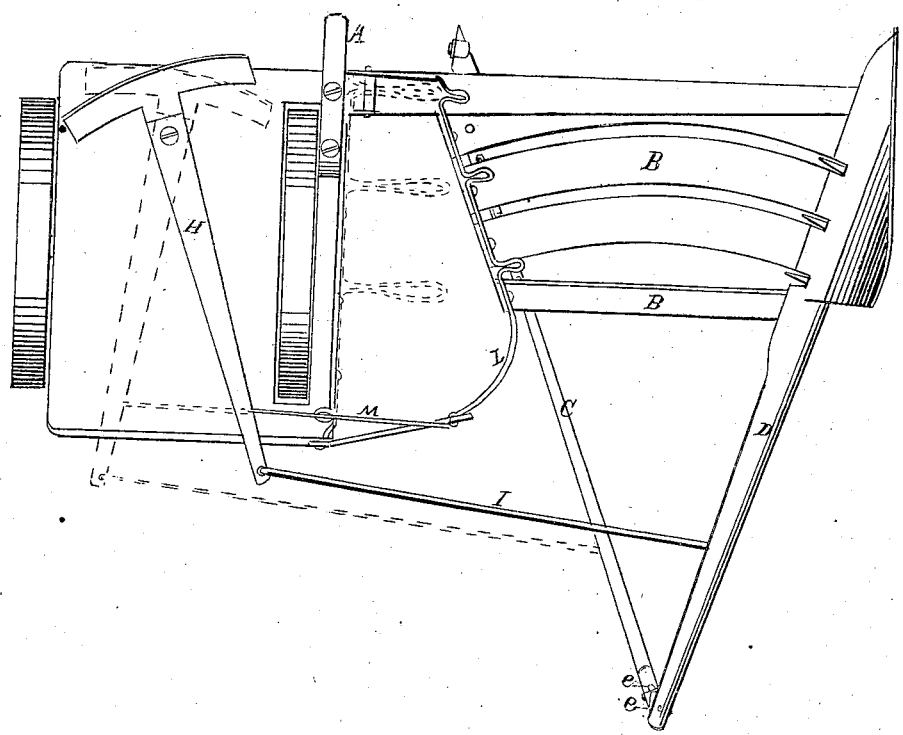
Figure 2:
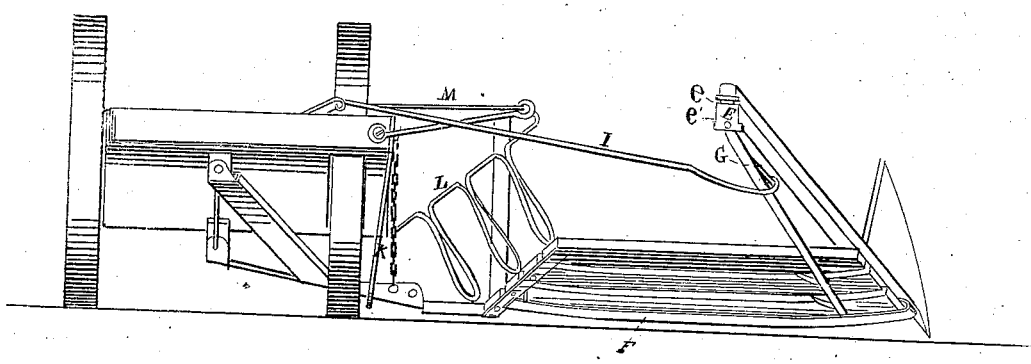

In the accompanying drawings, Figure 1 is a top view of a harvester with my improvements attached. Fig. 2 is a rear and partial bottom view of the same.

The chief object of my new arrangement of the rake under the platform of a harvester is to give perfect freedom and certainty of motion, while I avoid all cramping, friction, and complication of construction, and I believe my rake is an improvement over the rakes heretofore used under the platform.

The main frame of the machine and the traveling wheels may be of ordinary construction, as shown in Fig. 1. The tongue or pole A is placed at one side of the main frame in order to overcome the side draft.

The grain-platform of the machine is made of slats B, which may be either curved or straight, with more or less space between them for the free passage of the rake-teeth as the rake is moved across the platform of the machine.

The rake is made very simple and light, as shown at C, Fig. 1. The rear end of the rake-handle is attached to an arm, D, by means of a universal joint, E, having two pivots, *e* and *e'*. The forward end of the rake is supported by a plate, slat, or rod, F, which may be placed at any point between the cutters and the rear of the platform B. In order to operate the rake a lever, H, is placed upon the main platform and pivoted at *h*. This lever is connected with the rake by means of a rod, I, which is attached to an arm, G, upon the rake-handle. By this arrangement the motion of the lever H will carry the rake across the grain-platform backward and forward at pleasure.

When the lever H is so turned as to carry the rake to the right the action of the rod I upon the arm G turns the rake-teeth down in a horizontal position, as seen in black lines, Fig. 1, and the reverse motion of the lever H turns the points of the teeth directly upward, as shown in red lines in the same figure. Thus the rake-teeth travel to the right under the platform and free from the grain, but the motion to the left immediately makes the teeth project upward through or between the slats B, so as to sweep all the grain from the machine. During this motion of the rake a cut-off receives the falling grain in the usual manner, and afterward deposits the same on the platform. A wheel-guard, K, prevents the grain from being raked against and entangled by the traveling wheel of the machine.

In order to prevent the grain from falling over the left-hand side of the platform before a bundle is accumulated ready to be raked off I employ a vibrating grain-guard, L, which is hinged to the main frame and operated by a rod, M, connected with lever H. By the action of the lever H this grain-guard is raised at the moment the rake makes its stroke, as shown in red lines, Fig. 1.

The reel-post N is placed a considerable distance from the tongue or pole A, and from the hinge of the finger-beam, so as to allow the reel-post to fold over the tongue without cramping when the finger-beam is folded up for transportation or for passing obstacles in the track of the cutters.

My rake may be used without any cut-off to hold the falling grain while the rake sweeps the accumulated gavel from the machine, and the universal joint may be placed at a point nearer the rear of the platform, and a sleeve or other suitable device employed, in connection with the rake-handle, to allow the rake-teeth to be turned, as above described; and in place of the grain-guard any convenient support, as a dropper, spring-fingers, or other device, may be used to prevent the grain from falling off before the rake comes forward.

Having thus fully described my machine, what I claim, and desire to secure by Letters Patent of the United States, is—

1. Giving the rotary motion to the vibrating sweep-rake by means of the arm G and the universal joint at the rear of the rake, substantially in the manner and for the purposes set forth.

2. The arrangement and combination of the lever H, the connecting-rod I, and sweeping rake-handle, substantially as described.

3. The arrangement and combination of the grain-guard L, the rod M, and lever H, substantially as set forth.

GEORGE WELLHOUSE.

Witnesses:
 EDM. F. BROWN,
 DANIEL BREED.